(No Model.)
R. H. INGRAHAM.
MUSICAL CHART.
No. 532,964. Patented Jan. 22, 1895.
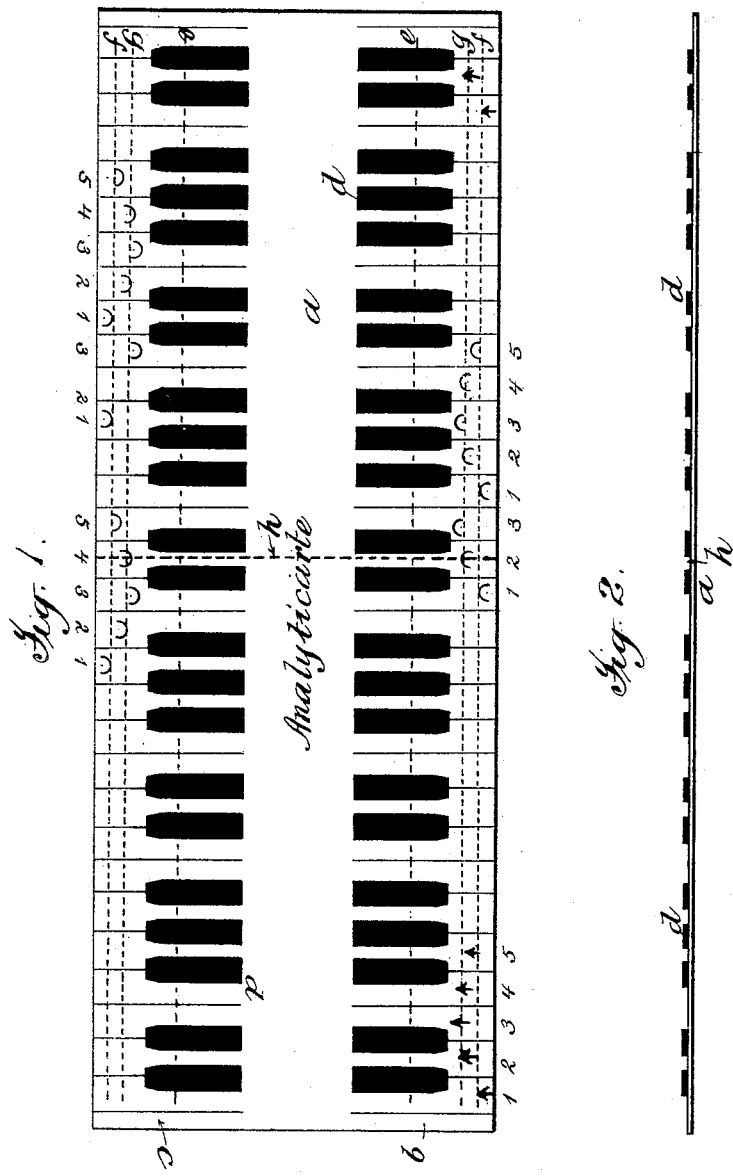

UNITED STATES PATENT OFFICE.

ROBERTA H. INGRAHAM, OF NEW YORK, N. Y.

MUSICAL CHART.

SPECIFICATION forming part of Letters Patent No. 532,964, dated January 22, 1895.

Application filed September 1, 1894. Serial No. 521,971. (No model.)

*To all whom it may concern:*

Be it known that I, ROBERTA H. INGRAHAM, a citizen of the United States, residing at New York, county of New York, and State of New York, have invented certain new and useful Improvements in Music-Instruction Charts, fully described and represented in the following specification and the accompanying drawings, forming a part of the same.

This invention relates to a musical instruction chart, which I shall term an "analyticarte," designed for music teachers in analyzing and instructing students in underlying principles of modern piano-forte playing, such as touch, the relative position of keys, and the mechanical movements of the arm, hand and fingers to produce certain results absolutely necessary to preserve a standard. Although designed primarily for this purpose, the chart provided by the present invention is capable of use for instruction in organ music and of other uses, as will be apparent hereinafter. Instruction in first principles has heretofore commonly been imparted by example and oral explanation with the aid of a piano or "dummy" piano. This method of instruction is, however, very unsatisfactory for many reasons. It is slow; very laborious to the teacher; the explanation given by the teacher is often not comprehended by the student and the teacher is therefore required to be constantly on the watch to see that the student in practicing his exercises is doing so in accordance with the explanation given; it necessitates individual instruction for each student in order to secure the best results of which the method is capable; and the results are often imperfect. To properly and rapidly instruct a student in these first principles, particularly if the student be a child, it is necessary that they should be demonstrated to him ocularly in some tangible form, separately, in regular order, and in connection with the keys of the piano so as to be impressed upon, and fixed in his mind. It is the object of the present invention to provide means for this purpose and to that end, the invention consists in a chart representing the keyboard, or a portion thereof, of a piano and composed of material, as silicate or the like, for receiving marks indicating, for example, the denomination of the keys, the points on each key on which the different fingers should strike, the exercises to be practiced, &c. The material of which the chart is composed being silicate or the like, marks made for one lesson may be erased from the chart before the second lesson is indicated and the chart thus used repeatedly.

In the accompanying drawings—Figure 1 is a plan view of a chart embodying the present invention and bearing marks indicating several lessons which will be hereinafter referred to. Fig. 2 is a longitudinal section of the same.

Referring to said drawings *a* represents a sheet of silicate or similar material the face of which is marked permanently by transverse black lines, which may be scored if desired to represent the white and black keys of a piano. In the drawings these keys are shown on a reduced scale. In use they correspond in size to those of an ordinary piano. Duplicate banks *b c* of keys are shown upon the sheet, arranged back to back, so that upon reversing the chart from the position shown, the bank *c* will be presented in proper position for use, one of said banks being intended for the use of the right hand and the other for the left hand. Each bank of keys contains four octaves, but the number of octaves may be varied, though this arrangement is preferred. The black keys are formed of strips *d* of silicate or similar material glued or otherwise secured to the sheet *a*, so as to project above the white keys, as in a piano key-board though preferably, as shown, not to the same extent.

These keys may be formed also by stamping up portions of the sheet *a*, if preferred. The black keys will preferably also be of uniform height, but they may be of different heights. Raised black keys are employed because they are of advantage in developing a sensitive feeling in the tips of the fingers.

The method of using the chart is as follows:—The first lesson to a student is that of a touch. In giving this lesson the teacher draws lines (as *e, f, g*) across the black keys, which I will call the "touch" lines. The student previously instructed, then moves his right hand along these lines from left to right, then the left hand from right to left, the tips of the fingers resting lightly on the keys. Each finger of each hand is then exercised similarly, and then several fingers together, always with the tips of the fingers only in contact with the keys. After this exercise has been repeated a sufficient number of times to create a sense of feeling at finger tips in the student's mind this line may be omitted in his subsequent practice. After the student has been thus instructed thoroughly the touch line is erased at teacher's will, when the chart will be ready for any other exercise.

The next lesson indicated on the chart is that of "placing" the fingers upon the keys, though the other exercises for developing touch and flexing the fingers intervene between this and the first lesson. In demonstrating this lesson to the student the teacher or student will mark the two lines $f\ g$, across the white keys, on one of the banks, which form guide lines, and marks such as those numbered 1, 2, 3, 4 and 5 (which I shall call "apply" marks) on keyboard $b$ on, above and below these lines, these marks corresponding to the first, second, third, fourth and fifth fingers (German fingering) of the student. The student instructed by the teacher as to the meaning of the lines and finger marks then rests the tip of his third finger upon the "apply" mark intended for third finger and then with perfectly loose wrist he draws the third finger lightly along the length of the line to the end, allowing the arm to fall at his side in the condition known to musicians as devitalized. This exercise is next repeated in a variety of exercises, such as 1—3, 2—3, 3—4, 3—5, 2—2, 1—3, 1—4, 1—5, &c., always with the fingers on or near the "apply" marks; thus gradually training the hand to seek a correct position and guarding against the stiffening of the wrist, which is so common, and a positive impediment to piano-forte playing. After this exercise has been performed the proper number of times with the right hand, the chart is reversed to bring the keyboard $c$ to position, the white keys of which are then provided with similar guide lines $f$, $g$, and marks for the fifth, fourth, &c., fingers applied to the keys, as before; the left hand being then exercised. When the student has been thoroughly drilled in this lesson with the aid of the guide lines and "apply" marks, so that these marks become fixed in his mind, their use may be discontinued, the student in continuing the exercise, upon a blank keyboard, imagining guide lines and marks taking the place of those erased.

In scale playing all teachers know that the thumb placing and wrist movement are important points. These are easily demonstrated in preliminary exercises, such as placing thumb upon an "apply" mark, throwing 1, 2, 3, 4, 5 over and back to marks indicated by the teacher and erased at will, leading up to the next exercise of a scale in the key of C on keyboard $b$ for the right hand; the guide lines $f\ g$ being employed, as also the "apply" marks 1, 2, &c. On the left hand keyboard $c$ is also indicated a scale in the key of G, for the left hand, including one black key, F-sharp. In preparing this latter scale for the student, the teacher will apply a mark, as shown, to the black key at the point where the student's finger should strike.

The several exercises heretofore referred to are but examples of the many uses to which the chart may be applied. In using the chart it is desirable to employ different colors for different exercises, for example red for the touch line with which the student's instruction is initiated, and so on, each color having a meaning previously explained to the student, a series of differently colored crayons being provided for each chart.

Although the several exercises referred to are indicated together on the chart shown, it will be understood that in use, as before stated, each exercise can be erased before another is indicated or several exercises, each in different color, indicated to be left for a stated time for practice.

Where a single student is to be instructed but one chart need be employed. Where, however, a class of students is instructed, a chart will be provided for each student and another for the teacher which may be arranged as the blackboard in a school room, and from which the teacher may instruct the pupils collectively, which is a very important advantage of the invention.

The charts may be presented to the pupils without marks upon them and the teacher then instruct them in the denominations and location of keys, &c., by causing the students to indicate upon the charts themselves by suitable marks in color the denominations of keys pointed out by the teacher on the latter's chart or the relative positions of keys named by the teacher.

The material employed for the chart will preferably be silicate and thin enough so as to be flexible, though other similar materials may be employed, if desired. By similar materials, I mean materials, such as slate, aluminum, celluloid, or painted board, which, like silicate, are capable of receiving marks from crayons or pencils, which may be afterward erased without injury to the chart. The chart may also be creased at $h$, as shown, if desired, so that it may be folded into small compass.

What is claimed is—

1. A music chart of silicate or similar material, provided with a fac simile representation of a key board, the black keys thereof being raised, substantially as described.

2. A music chart of silicate or similar material, provided with two fac simile representations of a keyboard, arranged back to back, the black keys thereof being raised, substantially as described.

3. A music chart of silicate or similar material provided with a fac simile representation of a key board, substantially as described.

In testimony whereof I have hereunto set my hand in the presence of two subscribing witnesses.

ROBERTA H. INGRAHAM.

Witnesses:
 GEO. P. STEELE,
 SAML. I. KNIGHT.